United States Patent [19]
Iima et al.

[11] Patent Number: 5,130,840
[45] Date of Patent: Jul. 14, 1992

[54] LIGHT SCANNING SYSTEM

[75] Inventors: Mitsunori Iima; Akira Morimoto, both of Tokyo, Japan

[73] Assignee: Asahi Kogyo Kogaku Kabushiki Kaisha, Tokyo, Japan

[21] Appl. No.: 791,017

[22] Filed: Nov. 12, 1991

Related U.S. Application Data

[60] Division of Ser. No. 617,254, Nov. 23, 1990, which is a continuation of Ser. No. 236,754, Aug. 26, 1988, abandoned.

[30] Foreign Application Priority Data

Aug. 26, 1987 [JP] Japan ................... 62-212115
Oct. 27, 1987 [JP] Japan ................... 62-270720
May 25, 1988 [JP] Japan ................... 63-127550

[51] Int. Cl.$^5$ ................ G02B 26/08; G02B 27/00
[52] U.S. Cl. ................... 359/220; 359/216; 359/433
[58] Field of Search ........ 359/205, 207, 196, 209–210, 359/212, 216, 220, 221, 223, 226, 433, 710, 711

[56] References Cited

U.S. PATENT DOCUMENTS

| | | | |
|---|---|---|---|
| 3,360,659 | 12/1967 | Young | 359/216 |
| 4,268,110 | 5/1981 | Ford | 359/216 |
| 4,379,612 | 4/1983 | Matsuoka et al. | 359/217 |
| 4,447,112 | 5/1984 | Matsuoka et al. | 359/212 |
| 4,756,584 | 7/1988 | Takanashi | 359/217 |
| 4,776,654 | 10/1988 | Ishizuka et al. | 359/217 |
| 4,915,465 | 4/1990 | Sugiura | 359/212 |
| 5,063,292 | 11/1991 | Brueggemann | 359/216 |

FOREIGN PATENT DOCUMENTS

| | | | |
|---|---|---|---|
| 57-144517 | 9/1982 | Japan | |
| 61-245129 | 10/1986 | Japan | |
| 62-240913 | 10/1987 | Japan | |
| 63-213384 | 8/1988 | Japan | 359/205 |

Primary Examiner—Bruce Y. Arnold
Assistant Examiner—James Phan
Attorney, Agent, or Firm—Sandler, Greenblum & Bernstein

[57] ABSTRACT

A light scanning system has a light source, a deflecting device, an anamorphic scanning lens having different refracting powers in a principal scanning plane and in a secondary scanning plane perpendicular to the principal scanning plane, and another anamorphic convex lens, such as a cylindrical lens, having a larger refracting power in the secondary scanning plane than in the principal scanning plane. The anamorphic convex lens is rotatable for adjustment about an axis of rotation that is substantially parallel with the optical axis of the optical system. When a tapered polygon mirror is used as the deflecting device, the anamorphic convex lens is mounted in a tilted manner such that two principal meridians projected via the reflecting surface of the deflecting device substantially coincide with respective scanning planes.

3 Claims, 8 Drawing Sheets

LIGHT SCANNING SYSTEM

This application is a division of application Ser. No. 07/617,254 filed Nov. 23, 1990, (pending); which is a continuation of application Ser. No. 07/236,754, filed Aug. 26, 1988, which is now abandoned.

BACKGROUND OF THE INVENTION

1. Field of the Invention

The present invention relates to a light scanning system that is provided with an anamorphic convex lens, such as a cylindrical lens, for the purpose of optically correcting errors in the inclination of the reflecting surfaces of a light deflecting device, such as a polygon mirror, or for the purpose of shaping the light beam emitted from a light source. The present invention further relates to a light scanning system provided with a tapered polygon mirror having a plurality of reflecting surfaces that are inclined by substantially the same angle with respect to the axis of rotation.

2. Description of the Prior Art

An example of a light scanning system already in use is shown in Japanese patent publication No. 144517/1982.

In the case of such a light scanning system, a light beam emitted from a light source is reflected by a polygon mirror and is converged onto a subject to be scanned through a single lens having a toric surface, forming a spot of light on the subject. The spot scans the subject as the polygon mirror is rotated.

In some types of light scanning systems, a cylindrical lens is placed in an optical path between the light source and the polygon mirror. The cylindrical lens functions to shape the beam of light emitted from the light source or to reduce the effects of errors in the inclination of the reflecting surfaces of the polygon mirror used as a deflecting device. Further, such cylindrical lens and the above-mentioned single lens constitute in combination an anamorphic optical system. In this specification, the phrase "in the inclination of a reflecting surface" means the inclination angle of the reflecting surfaces with respect to the axis of rotation arising from some cause concerned with the manufacturing process, the reflecting surface having to be parallel with the axis of rotation.

In the case of the above-mentioned anamorphic optical system, one of two principal meridians (generatrix, in the case of a cylindrical lens) of each optical element must substantially coincide with the principal scanning direction. The phrase "principal meridians" means the intersections of the lens surface and the principal sections including the optical axis where the power of the lens has a maximum or minimum value. The optical elements for use in the light scanning systems under consideration are designed to have two principal meridians which intersect each other at right angles. Further, the phrase "principal scanning direction" means the direction in which the spot of light scans, a direction within a plane which is perpendicular to the axis of rotation of the polygon mirror. The phrase "secondary scanning directions", to be described below, means the directions perpendicular to the principal scanning direction.

The directions of the above-defined principal meridians may sometimes be erroeneous, due to processing errors or assembling errors of the element, and such erroneously directed principal meridians will deteriorate the converging characteristics and spot configurations on the subject surface to be scanned. Such deterioration is greater at the peripheral regions than at the center of the subject to be scanned.

If each optical element is processed to a high accuracy so as to more accurately coordinate the principal meridians with the principal scanning direction, the mass production efficiency becomes lower. Besides, the convex lens placed in the optical path between the light source and the deflecting device, which is employed so as to compensate for inclination errors and shape the light beam, is generally small in size. Hence, it is difficult to accurately process such a small element. Moreover, accurately assembling processed optical elements in a system should be performed within small tolerances.

Meanwhile, the above-mentioned polygon mirror is produced by a process that includes the steps of shaping a material, such as glass or aluminium alloy, into a predetermined prismatic form, polishing the side surfaces to form reflecting surfaces of a predetermined accuracy, and plating the side faces with silver or aluminium.

There is, however, a problem in that it is difficult (and, hence, it takes a long time) to perform the step of polishing the sides of the prism up to the required accuracy. The step must be repeated for each one of the products. Thus, the mass production efficiency is poor and the manufacturing cost is high.

Recently, a polygon mirror has been proposed which can be produced as a single body by injection molding of plastics using a mold. To produce polygon plastic mirror, only a mold is required but high-accuracy processing of each product is not required, so that a high mass production efficiency can be achieved.

To produce plastic polygon mirrors having reflecting surfaces parallel to the axis of rotation, a split mold with a slide core must be used, since any draft cannot be imparted to the reflecting surfaces. To produce a split mold, many steps must be performed, raising the cost. In addition, it is difficult to achieve high accuracies.

Where drafts can be imparted to the reflecting surfaces, a mold of high accuracy can be produced. It is possible to reduce the deterioration of the accuracy due to abrasion of the mold, and the performance of the products will become higher. If, however, a tapered polygon mirror is incorporated into a light scanning system, two problems occur, as described below.

The first problem lies in that the scanning line on the subject to be scanned will be inclined or curved so that a formed pattern will be distorted.

This problem can be solved using means for compensating for errors in the inclination of reflecting surfaces which has already been in use. Examples of such means are disclosed in Japanese laid-open patent application Nos. 144517/1982 and 245129/1986. In the former, a line image is formed on the reflecting surface. The latter includes a scanning lens which has a shorter focal length in the secondary scanning direction than in the principal scanning direction so as to reduce the effect of inclination errors, and in which the refracting power in the secondary scanning direction can be compensated for by means of a convex cylindrical lens that is placed before the deflecting device.

It is known that the scanning line can be corrected by making the scanning lens eccentric in the secondary scanning direction if the effect of the above-mentioned compensation is insufficient.

The second problem lies in that, where a convex cylindrical lens and an anamorphic fθ lens are placed before and after a polygon mirror, torsion will apparently occur between the generatrix of the convex cylindrical lens and the principal meridians of the fθ lens due to the torsion of the light beam occurring upon reflection. The quality of the imaging function is thus lowered.

The reason for the occurrence of the second problem will be explained with reference to FIGS. 13-15.

Figure 13:
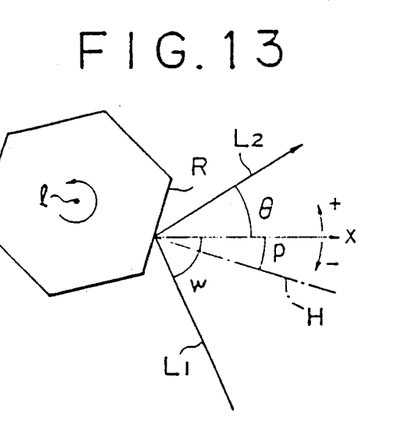
FIG. 13 is an illustration showing the function of a polygon mirror having not tapered reflecting surfaces.

In the case of FIG. 13, reflecting surfaces R are parallel to an axis of rotation l, and therefore there are no inclination errors. An axis x in this figure represents the optical axis of an fθ lens, not shown, and dashed line H represents a normal to the reflecting surface R. θ represents the scanning angle formed by optical axis $L_2$ of a reflected light beam and an x-axis; p represents a polygon normal angle formed by normal H and the x-axis; w represents an incident angle formed by optical axis $L_1$ and the x-axis. If there is no taper, the scanning angle θ is expressed as follows:

$$\theta = 2p - w,$$

and the angle formed by the optical axis $L_2$ of the reflected light beam and a plane (plane of the sheet of the drawing) containing the principal scanning direction is 0°.

When the reflecting surfaces R are imparted a small tapering angle δ, and (see FIG. 14) the remaining elements are the same as the foregoing, the scanning angle θ is substantially the same as that described above and can be expressed by:

$$\theta = 2p - w.$$

Figure 15:
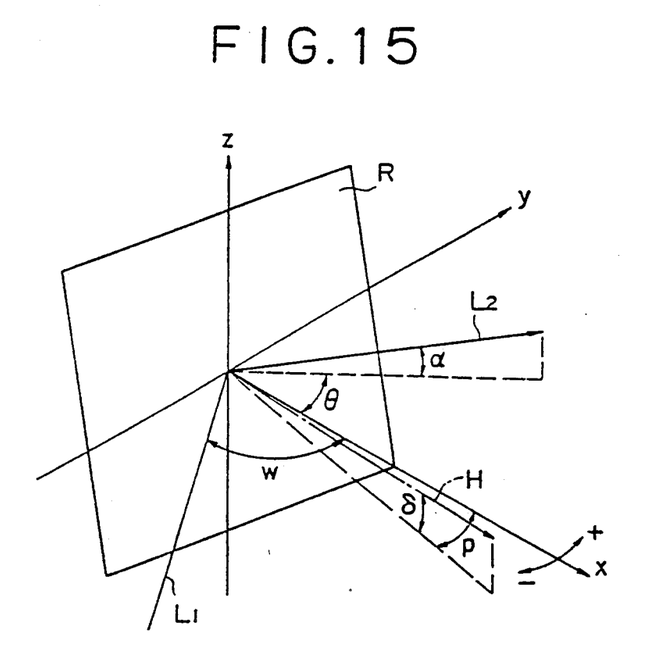
FIG. 15 is an illustration showing the function of the tapered polygon mirror.

With respect to FIG. 15, it is assumed that the x-axis represents the optical axis of an fθ lens (not shown), a y-axis represents the scanning direction, a z-axis represents a direction parallel to the axis of rotation l, and that the dashed line H represents a normal to the reflecting surface R. Angle α formed by the optical axis of the reflected light beam and the principal scanning plane (i.e. x-y plane) is expressed by the following equation:

$$\alpha = \sin^{-1}(\sin 2\delta \cdot \cos(p - w)).$$

When the value of δ is small, $$\alpha = 2\delta \cdot \cos(p - w).$$

Torsion angle β of the light beam due to reflection may be expressed by the following equation:

$$\beta = \{-D \cdot \tan(p - w) \cdot \tan(\sin^{-1}(\sin 2\delta \cdot \cos(p - w)))\}/D$$
$$= -\tan(p - w) \cdot \tan(\sin^{-1}(\sin 2\delta \cdot \cos(p - w))).$$

When the value of δ is small, $$\beta = -\tan(p - w) \cdot 2\delta \cdot \cos(p - w)$$
$$= -2\delta \cdot \sin(p - w).$$

The torsion of the light beam will cause an apparent inclination between the generatrix of the convex cylindrical lens and the principal meridians of the fθ lens which is in the principal scanning plane, and as a result the wave front aberration becomes worse.

SUMMARY OF THE INVENTION

An object of the present invention is therefore to provide a light scanning system which is easy to adjust during assembling and can provide good converging characteristics and good spot configuration on a subject surface to be scanned, and which is capable of compensating for the torsion of the light beam, thus maintaining the quality of imaging function, when a tapered plastic plygon mirror, is used which is advantageous from the viewpoint of manufacture.

To restrict the degradation of converging characteristics and of the spot configuration, arising from irregularity of the directions of the principal meridians of the optical elements, within a practically acceptable range, all the meridians of the optical elements must not necessarily be directed parallel to the principal scanning direction, but at least the principal meridians of all the optical elements should coincide with one another if they do not precisely coincide with the principal scanning direction.

The present invention allows one to adjust the anamorphic convex lens about the optical axis which is for compensating for surface inclinations or for shaping a beam. Lenses of such type may often be erroneously processed along the principal meridians.

In accordance with the above-described construction, by rotating and adjusting the anamorphic convex lens, the directions of such a lens and other lenses, which constitute an anamorphic optical system, can be adjusted to substantially coincide with one another. Therefore, the converging characteristics and the spot configuration on the subject surface to be scanned may be improved without any decrease in the mass production efficiency due to increased processing accuracy.

When a tapered polygon mirror is used, the torsion of the light beam by a reflecting surface may be canceled by inclining the anamorphic convex lens by a predetermined angle so as to impart a torsion of the opposite direction to the light beam before it can reach the reflecting surface. This allows one to make the principal meridian of the convex lens apparently coincide with the principal meridians of the scanning surfaces or of the anamorphic fθ lens, and thus allows one to efficiently prevent the degradation of wave front aberration.

BRIEF DESCRIPTION OF THE DRAWINGS

FIGS. 3(A)-3(C) is a view showing spot configurations and intensity distribution before a cylindrical lens is corrected with respect to its inclination;

FIGS. 4(A)-4(C) is a view showing spot configurations and intensity distribution after the inclination is corrected;

DESCRIPTION OF THE EMBODIMENTS

The present invention will now be described with reference to the drawings.

FIRST EMBODIMENT

Figure 1:
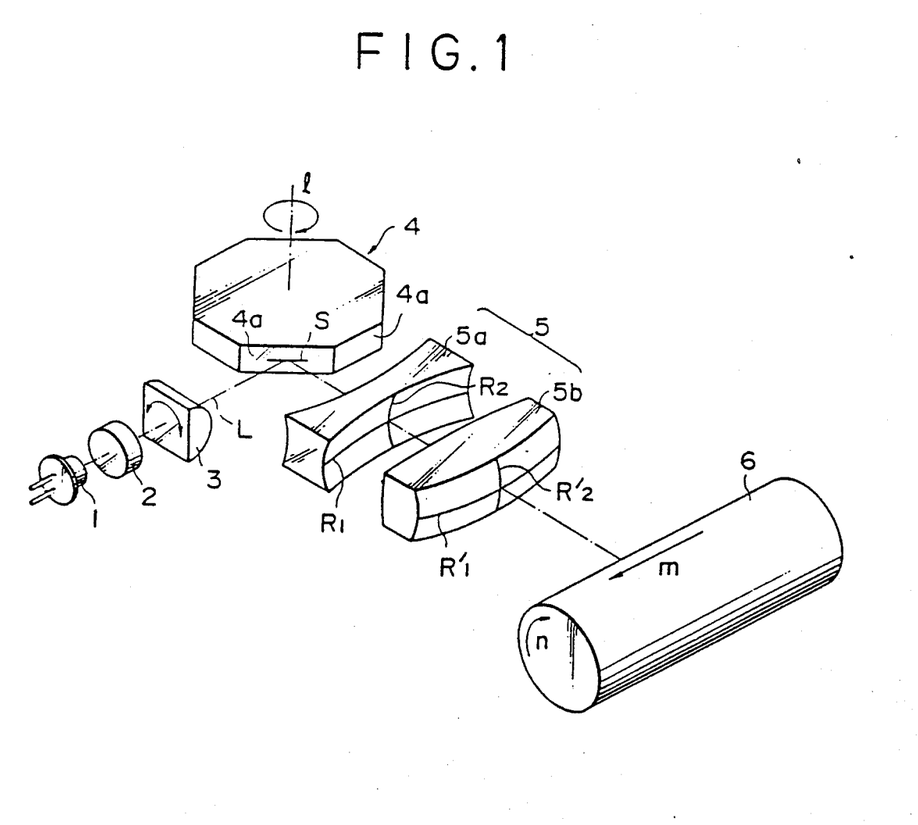
FIG. 1 is a view showing a first embodiment of the light scanning system according to the present invention.

FIG. 1 shows a first embodiment of a light scanning system according to the present invention.

It shows an optical system of a laser printer using a semiconductor laser as a light source, and a polygon mirror as a deflecting device.

A divergent beam of light emitted from a semiconductor laser 1 is shaped into a parallel beam of elliptic section by a collimator lens 2, and passes through a cylindrical lens 3 as an anamorphic convex lens.

A deflecting device 4 in the form of a polygon mirror having eight reflecting surfaces 4a, 4a, ... and driven by a driving mechanism (not shown) for rotation about an axis l.

The light beam reflected by one of the reflecting surfaces 4a of the polygon mirror 4 changes its direction of travel, and angle $\theta$ of deflection of the outgoing beam from an f$\theta$ lens 5 also changes as the polygon mirror 4 rotates.

The outgoing beam from the f$\theta$ lens 5 is converged onto a photosensitive drum surface 6 to be scanned, thus forming a spot thereon which scans the photosensitive drum surface 6 in a principal scanning direction m as the angle of deflection changes. Laser 1 is turned ON and OFF in response to a control signal, and it exposes the photosensitive drum surface 6 in a certain pattern of dots. Since the photosensitive drum 6 continuously rotates in a secondary scanning direction n at a speed lower than the scanning speed, the scanning motion of the spot is combined with the drum's rotation to form a dotted image pattern. The thus formed pattern is transferred, or outputted, by a copying system (not shown) onto a sheet of paper.

The cylindrical lens 3 has a magnifying power along only one ($R_2$) of two principal meridians $R_1$ (generatrix) and $R_2$, which are shown in FIG. 1 and which intersect each other at right angles. The lens 3 is rotatable for adjustment about optical axis L, as described below. The f$\theta$ lens 5 consists of two lens elements 5a and 5b, each of which has a toric surface whose two principal meridians ($R_1$, $R_2$; $R_1'$, $R_2'$) have different centers of curvature.

The above-described optical system is an anamorphic optical system having different refracting powers in longitudinal and transverse directions on the image surface, and has different functions in the principal scanning plane containing the direction of scanning of the light beam and the secondary scanning plane perpendicular thereto. Therefore, the different functions are described separately.

The light beam emitted from the laser 1 has an anisotropy with respect to the angles of divergence; angle of divergence $\theta_1$ in a direction perpendicular to the p-n junction is larger than an angle of divergence $\theta_2$ in a direction parallel to the p-n junction ($\theta_1 > \theta_2$). The laser 1 is positioned such that the direction perpendicular to the p-n junction coincides with the principal scanning plane.

The parallel beam outgoing from the collimator lens 2 passes through the cylindrical lens 3. Since the cylindrical lens 3 has no refracting power in the principal scanning plane, i.e. in direction $r_1$, the light beam passes through it without being affected. The light beam is then reflected and deflected by a reflecting surface 4a of the polygon mirror 4 and is converged onto the photosensitive drum surface 6 via the f$\theta$ lens 5.

The f$\theta$ lens 5 is imparted with a negative distortion such that the following equation holds within the principal scanning plane containing the directions $R_1$ and $R_1'$:

$$y = f \cdot \theta,$$

where
 "y" is the height of image;
 "f" is the focal length within the principal scanning plane; and
 "$\theta$" is the angle of deflection.

Thus, the scanning speed of the spot of light on the drum surface can be kept constant as long as the rotating speed of the polygon mirror 4 is constant.

The cylindrical lens 3 has a refracting power in the secondary scanning plane, so that the passing light beam forms a line image S in the vicinity of the reflecting surface 4a. The light beam is then reflected and deflected by the reflecting surface 4a and is again converged onto the photosensitive drum 6.

With respect to directions $R_2$ and $R_2'$, the f$\theta$ lens 5 has such a refracting power as to place the reflecting surface 4a and the photosensitive drum 6 in an optically conjugate relationship. Such a construction can reduce possible dislocation of the scanning line which can arise from possible errors in the inclination of the reflecting surfaces 4a. The present invention, however, is still effective if those elements are not in an optically conjugate relationship.

Now, a first embodiment of an adjusting means for adjusting the cylindrical lens 3 by rotating it about optical axis L will be described, with reference to FIG. 2.

Figure 2:
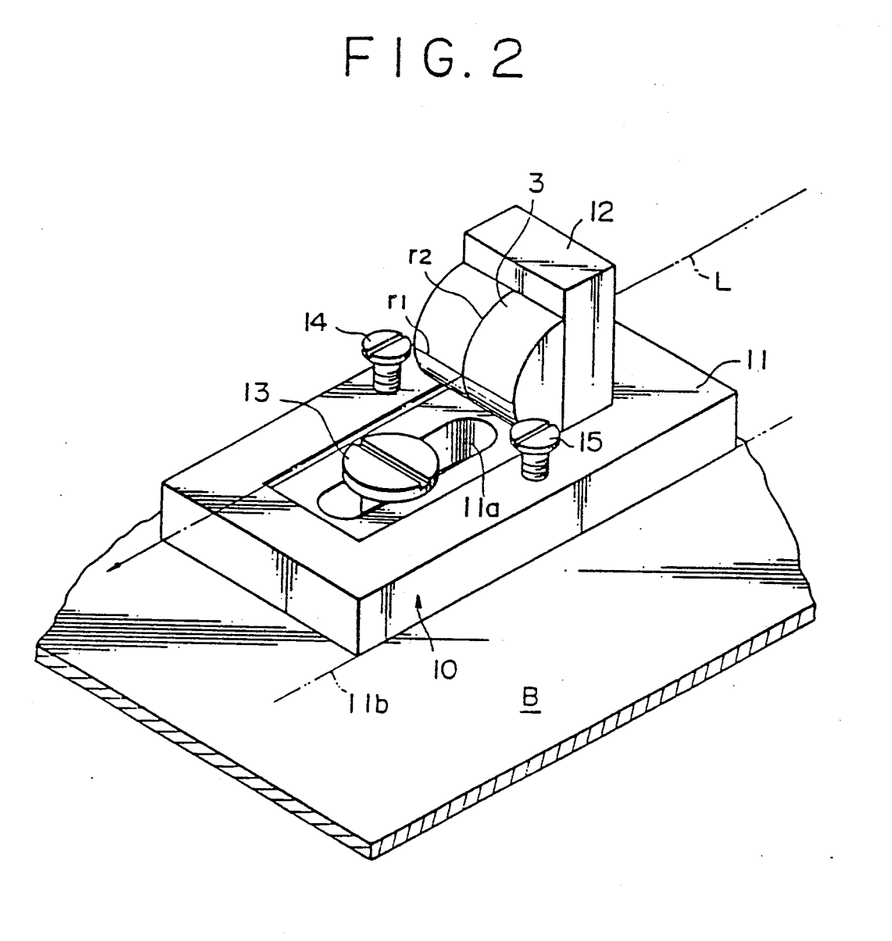
FIG. 2 is a perspective view of an adjusting pedestal which is an example of adjusting means.

The adjusting means shown in FIG. 2 comprises an adjusting pedestal 10 that is tiltably mounted on a base plate B, to which some parts are fixed, which pedestal 10 has the cylindrical lens 3 fixed thereto.

As shown, the adjusting pedestal 10 comprises a horizontal plate 11 and a vertical plate 12 standing up from the horizontal plate portion 11.

A slot 11a is cut in the central portion of the horizontal plate 11 along the direction of the optical axis L, through which a fixing screw 13 then passed and is screwed to the base plate B.

Adjusting screws 14, 15 are screwed into tapped holes provided on both sides of the slot 11a. If the operator turns either one of the adjusting screws 14, 15 in the tightening direction, the turned screw will push the base plate B, and as a result, the corresponding side of the adjusting pedestal will be raised relative to the opposite side.

The upright plate 12 has the cylindrical lens 3 secured thereto by an adhesive, and an optical path bore (not shown) is provide along the optical axis L to allow a light beam to pass through the cylindrical lens 3.

If the fixing screw 13 is loosened and adjusting screw 14 is tightened, the tightened adjusting screw 14 will push the base plate B so that the adjusting pedestal 10 will be turned about an axis of rotation 11b, i.e. a lower edge of the horizontal plate 11, which is substantially parallel to the optical axis L, whereby the direction of the generatrix $r_1$ of the cylindrical lens 3 is changed relative to the light beam. If adjusting screw 15 on the opposite side is tightend, then the adjusting pedestal 10 will be turned about the other axis of rotation, i.e. the opposite lower edge of the horizontal plate 11, so that the direction of the generatrix $r_1$ of the cylindrical lens 3 will be changed to the opposite side.

The direction of the generatrix $r_1$ of the cylindrical lens 3 relative to the light beam can be adjusted to coincide with the principal meridians $R_1$, $R_1'$ of the $f\theta$ lens 5, whereby the converging characteristics of the light beam can be improved and the configuration of the spot of light on the photosensitive drum surface 6 can advantageously be corrected.

Figure 3:
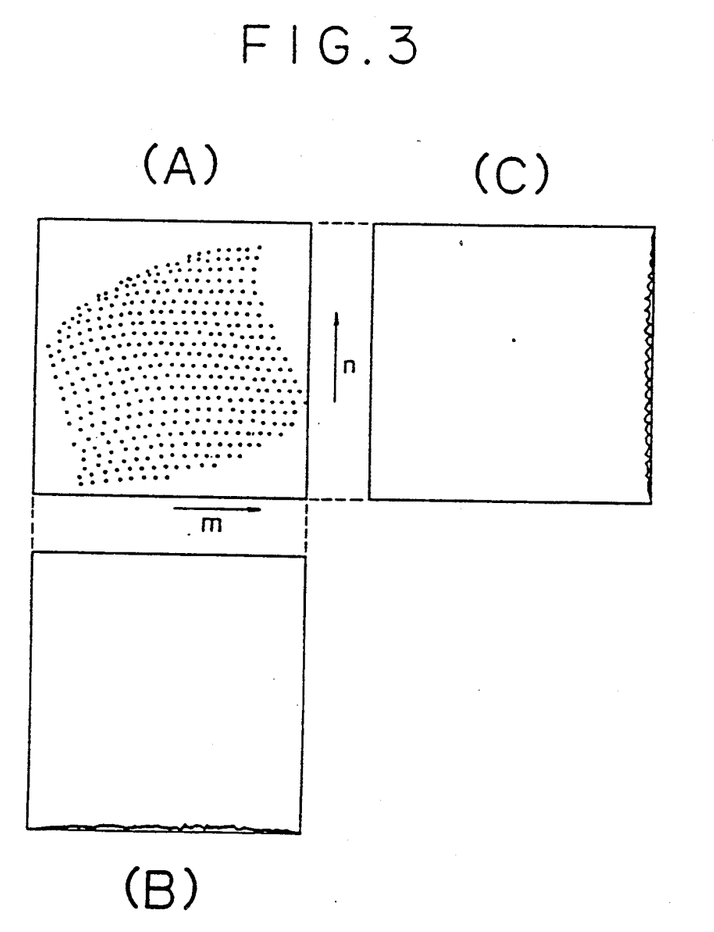

If the generatrix $r_1$ of the cylindrical lens 3 is inclined, for example by 10' (10 minutes), relative to the principal meridians $R_1$, $R_1'$ of the $f\theta$ lens 5, due to e.g. processing errors, then the configuration and intensity distribution of the spot of light on the photosensitive drum surface 6 are as shown in FIG. 3. FIG. 3A is a spot diagram on the image surface, having a scale in which one side is 40 $\mu$m long. FIG. 3 (B) represents the intensity distribution of the spot of light shown in FIG. 3(A) along the principal scanning direction m, while FIG. 3(C) represents the intensity distribution along the secondary scanning direction n. A clear image cannot be obtained when the light beam is dispersed in such a wide area.

Figure 4:
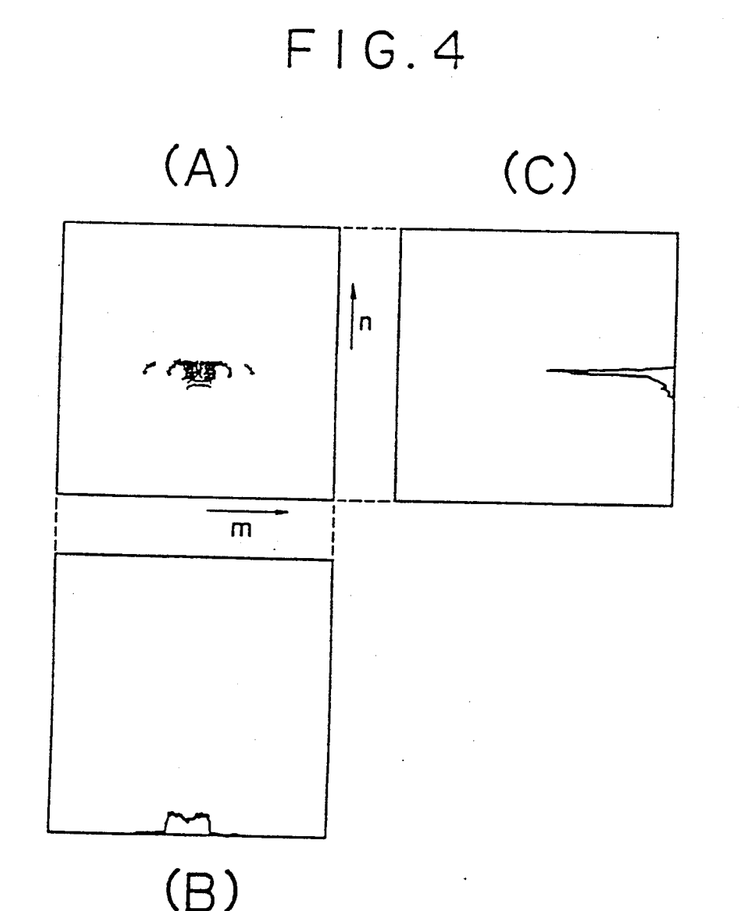
Figure 5:
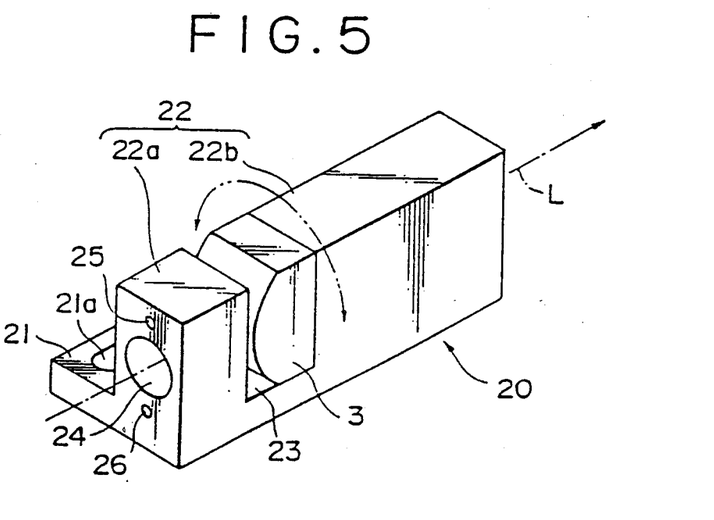
FIGS. 5-9 are views showing other examples of the adjusting means.
Figure 6:
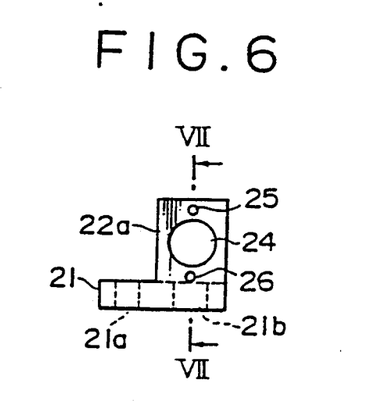
Figure 7:
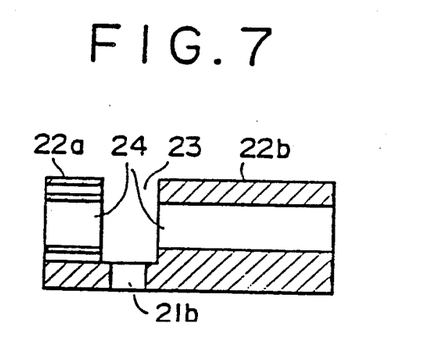
Figure 8:
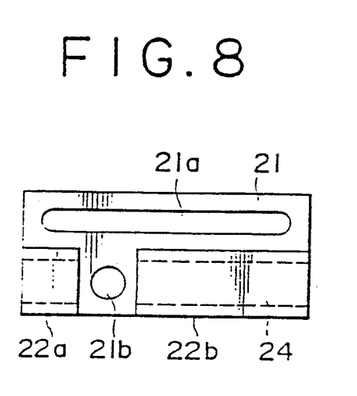

It is possible to achieve a configuration and intensity distribution shown in FIG. 4 by compensating for the 10' (10 minutes) inclination by means of the adjusting mechanism. FIGS. 4(A)-4(C) are similar to those of FIG. 3. A clear image pattern can be achieved when the light beam can be converged in a manner as shown in FIG. 4.

FIGS. 5-9 illustrate a second embodiment of the adjusting means.

In this embodiment, unlike the above described first embodiment of FIG. 2, an adjusting pedestal 20 is fixedly mounted to the base plate B (see FIG. 2), while the cylindrical lens 3 is rotatable for adjustment relative to the pedestal 20.

The adjusting pedestal 20 has an L-shaped cross section perpendicular to the optical axis L, one side of which forms a thin-walled fixing portion 21 and the other side of which forms a thick-walled optical path portion 22.

Similar to the embodiment of FIG. 1, the fixing part 21 has a slot 21a provided therein which extends along the optical axis L, which serves for fixing the adjusting pedestal 20 in an adjustable manner in the direction of the optical axis L.

The fixing portion 22 is divided into two blocks 22a and 22b by a spacing 23 for holding the cylindrical lens 3 therein. Both blocks have an optical path bore 24 provided therethrough along the optical path L, while at the spacing portion 23 there is provided an adhesive bore 21b which, similar to slot 21a, vertically extends through the wall.

Figure 9:
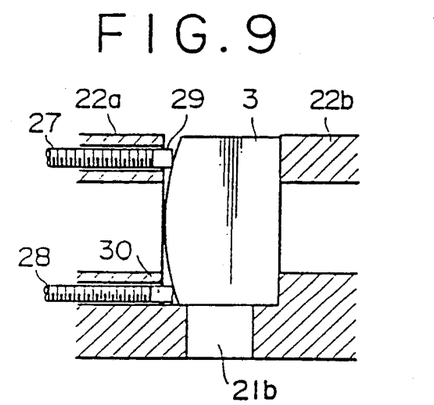

Block 22a has tapped holes 25 and 26 provided therethrough on the upper and lower sides of the optical path bore 24. Tips of screws 27 and 28 engaged with the tapped holes abut against the cylindrical lens 3 with resin pieces 29 and 30 interposed therebetween, as shown in FIG. 9.

The pedestal 20 is positioned such that the block 22a lies toward the collimator lens 2 and the other block 22b toward the polygon mirror 4.

When the pedestal 20 is installed, the screws 27 and 28 are lightly tightened so as to temporally fix the cylindrical lens 3 by the resin pieces 29 and 30, and the lens 3 is rotated for adjustment. Subsequently, the adhesive bore 21b is filled with an adhesive for permanently fixing the cylindrical lens 3.

The adhesive bore 21 is not essential and the adhesion may alternatively be achieved on the side of the cylindrical lens 3.

SECOND EMBODIMENT

FIGS. 10-15 show a second embodiment of the light scanning system according to the present invention. The elements of the second embodiment which are common to the first embodiment are given the same reference numerals and will not be described again so as to avoid duplicate explanation. Only the differences between the second embodiment and the first embodiment will be described.

Figure 10:
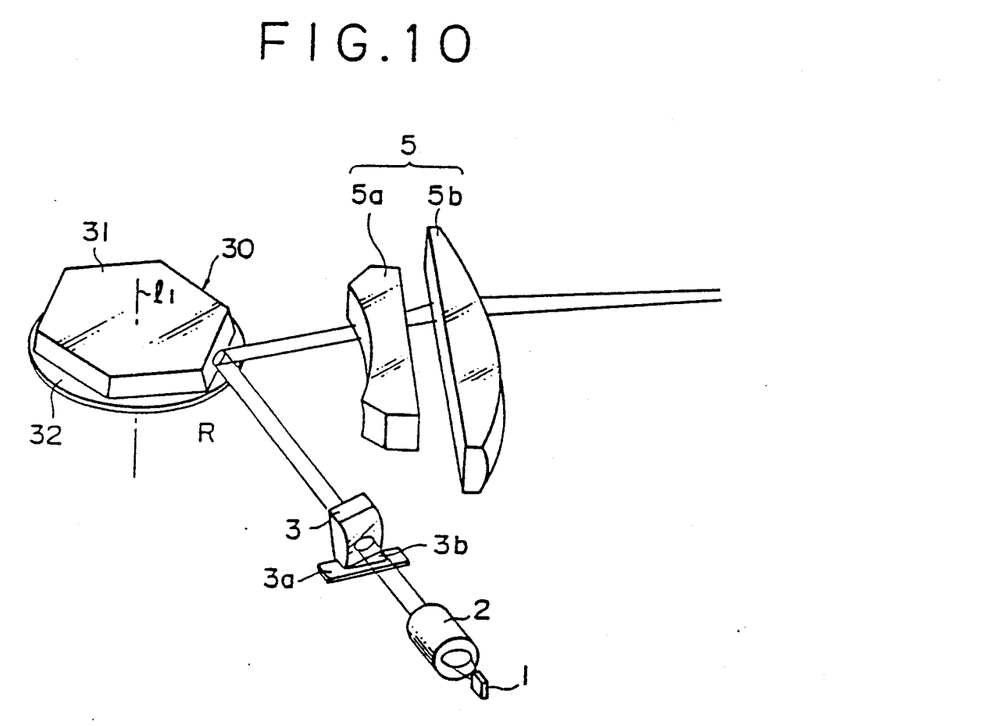
FIG. 10 is an illustration showing a second embodiment of the light scanning system according to the present invention.

The second embodiment includes a deflecting device in the form of a tapered polygon mirror 30 having a plurality of reflecting surface inclined by a substantially identical angle with respect to the axis of rotation.

Figure 11:
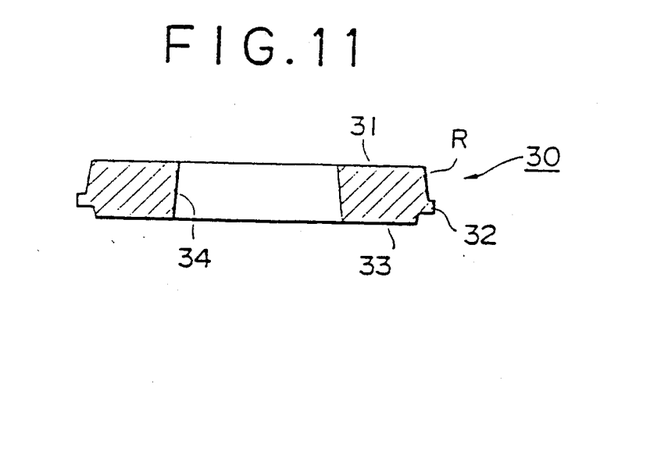
FIG. 11 is a sectional view of the tapered polygon mirror shown in FIG. 10.

The tapered polygon mirror 30 is a single body of, e.g., polycarbonate, formed by means of a mold. As shown in FIG. 11, the polygon mirror 30 comprises a reflecting portion 31 whose outside forms reflecting surfaces R, a flange 32 projecting outwardly of the reflecting portion 31, and a projecting portion 33 projecting downwardly of the flange 32, in FIG. 11. The polygon mirror 30 has a mounting bore 34 (not shown in FIG. 10) in the central flat portion thereof, which extends through the mirror 30 and is used for mounting it to a suitable device.

To form a polygon mirror 30 of such a configuration, a mold may be employed which has a parting line along the side of the flange 32 adjacent to the reflecting portion 31, and which has a core facing the flange 32, a projecting portion 33 and a mounting hole 34, and which has cavity walls facing the reflecting portion 31.

The flange is for making the distance from the mold gate to the outer diameter uniform during molding, whereby the quality of molding can be improved so that occurrence of molding defectives, such as sinks or weld lines, can be avoided and a high molding accuracy can be kept irrespective of variations in molding conditions.

In the optical system shown in FIG. 10, the diverging beam of light emitted from the laser 1 is shaped into a parallel beam of elliptic cross section by a collimator lens 2 and passes through the convex cylindrical lens 3 and is then reflected and deflected by the tapered polygon mirror 4.

Subsequently, the beam reflected from the tapered polygon mirror 30 makes incident to the $f\theta$ lens 5 at a variable incident angle, which lens 5 has principal meridians within the principal scanning plane. The beam of light eventually forms a spot of light on a subject surface (not shown), whereby the subject is scanned.

Figure 14:
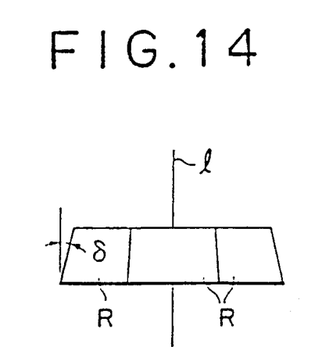
FIG. 14 is a side view of a tapered polygon mirror.

Assuming that the value of the inclination of the reflecting surfaces R of the tapered polygon mirror 30 with respect to the axis 1 of rotation is represented by $\delta$, as shown in FIG. 14, the angle of torsion $\beta$ of the light beam is expressed by the following equation, as described above:

$$\beta = -2\delta \cdot \sin(p-w).$$

In view of this, the convex cylindrical lens 3 is mounted on the pedestal 3a with a wedge 3b interposed therebetween so as to incline the generatrix relative to the principal scanning plane, whereby the generatrix of the convex cylindrical lens projected via the reflecting surfaces R can be adjusted to substantially coincide with the principal meridians of the f$\theta$ lens 5. Thus, the angle of torsion $\beta$ can be cancelled. The adjustment of the inclination of the cylindrical lens 3 may be performed by a device other than the wedge described above, such as an adjusting pedestal similar to the one of the first embodiment shown in FIGS. 2 and 5.

The angle of torsion $\beta$ will change with polygom normal angle p as the polygon mirror is rotated. However, when the scanning angle is narrow, deterioration of the wave front aberration can be avoided by making a correction with respect to the center line of the effective scanning angle. Since the center line in general lies in the optical axis of the f$\theta$ lens 5, i.e. $\theta=0°$, $$p = w/2,$$

and the set angle $\beta_o$ given to the convex cylindrical lens is expressed as follows:

$$\beta_o = -2\delta \cdot \sin(w/2).$$

In this example, the inclination angle $\delta = 2°$ and the set angle $\beta_o = 1.5°$, and the directions of the generatrix is deviated counterclockwise with respect to the principal scanning plane as seen in the direction in which the beam of light travels.

Figure 12:
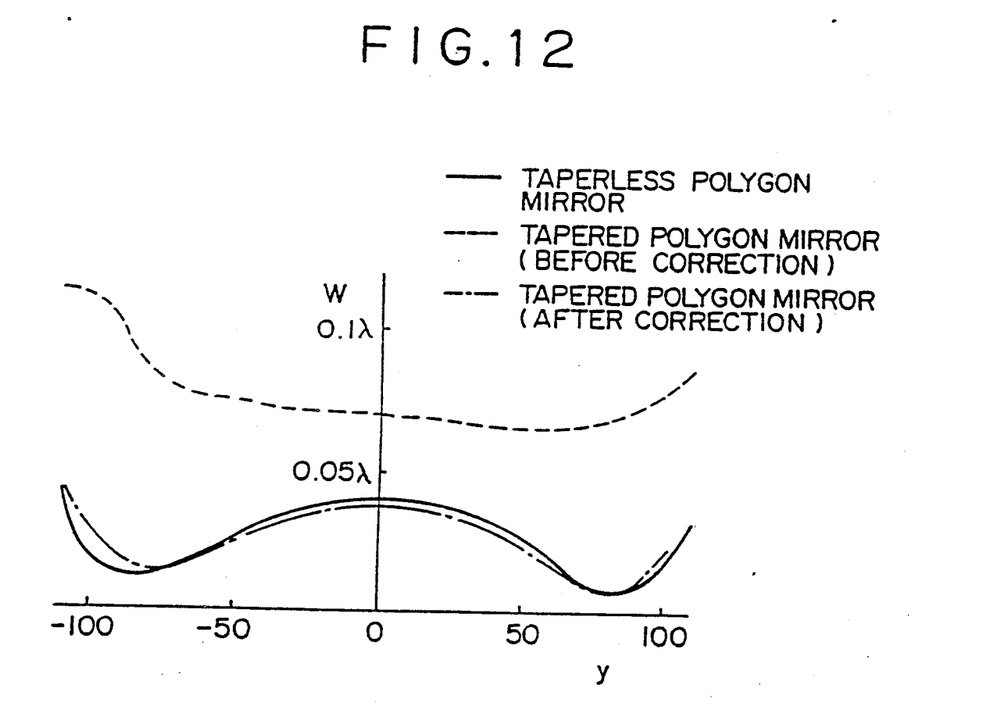
FIG. 12 is a graph showing wave front aberration.

FIG. 12 shows values of wave front aberration of the light scanning systems, in which a solid line represents a wave front aberration of the system using a non-tapered polygon mirror. In FIG. 12, a broken line represents a wave front aberration of the system using the above-described tapered polygon mirror in which the generatrix of the convex cylindrical lens 3 coincides with the principal scanning plane. An alternate long and short dash line in FIG. 12 shows a wave front aberration of the system in which a tapered polygon mirror is used and the generatrix of the convex cylindrical lens 3 is inclined 1.5° with respect to the principal scanning plane.

Where the beam of light emitted from a light source has a non-circular cross section, as in the above example, the light source should be rotated together with the convex cylindrical lens 3. The laser 1, the collimator lens 2 and the convex cylindrical lens 3 may be united in a single assembly which is rotatably mounted about the optical axis $L_1$.

Further, in the above example, the reflecting surfaces and the optical axis $L_1$ of the incident light are in a relationship as shown in FIG. 10. Alternatively, however, other configurations are also possible.

(a) In the system of FIG. 10, the tapered polygon mirror 30 may be positioned such that the flange 32 faces upwardly while the generatrix of the convex cylindrical lens 3 is inclined clockwise with respect to the principal scanning plane (reversed with respect to the inclination shown in FIG. 10) as seen in the direction in which the beam of light travels.

(b) In the system of FIG. 10, the light projecting part and the convex cylindrical lens 3 may be placed above the tapered polygon mirror 30 in FIG. 10 and the light beam is projected in the opposite direction with respect to the direction shown, while the generatrix of the convex cylindrical lens 3 is inclined clockwise with respect to the principal scanning direction (reversed with respect to the direction shown in FIG. 10) as seen in the direction in which the beam of light travels.

(c) In the system of FIG. 10, the tapered polygon mirror 30 may be positioned such that its flange 32 is located upwardly, and the light projecting part and the convex cylindrical lens 3 are located above the tapered polygon mirror 30 in FIG. 10, and the light beam is projected in the opposite direction with respect to the direction shown in FIG. 10. The generatrix of the convex cylindrical lens 3 is inclined counterclockwise with respect to the principal scanning direction (similar to FIG. 10) as seen in the direction in which the beam of light travels.

Any of these configurations allows one to make the generatrix of the convex cylindrical lens 3 projected via the reflecting surfaces R substantially coincide with the principal meridians of the f$\theta$ lens 5, whereby an improved wave front aberration can be achieved and the quality of imaging can be improved.

Further, the above-described examples use an anamorphic f$\theta$ lens. When a lens of rotation symmetry is used, the generatrix of the cylindrical lens projected to the side of the f$\theta$ lens by the reflecting surfaces R should be inclined to substantially coincide with the principal scanning plane.

Also, where the elements have torsion of the principal meridians, as in the first embodiment, while the reflecting surfaces of the polygon mirror have an inclination, the inclination angle should be determined in consideration of such torsion and inclination.

What is claimed is:

1. A light scanning system, comprising:
   a light source;
   a tapered polygon mirror having a plurality of reflecting surfaces respectively inclined by a substantially identical angle with respect to the axis of rotation thereof for reflecting and deflecting a beam of light emitted from said light source;
   a scanning lens for converging said deflected light beam onto a subject surface to be scanned; and
   an anamorphic convex lens having a refracting power in a principal scanning plane, containing the direction of scanning of said light beam, that is smaller than in a secondary scanning plane that is perpendicular thereto, said anamorphic convex lens being mounted in a tilted manner such that two principal meridians projected via said reflecting surface substantially coincide with each scanning plane.

2. The light scanning system as claimed in claim 1, wherein said anamorphic convex lens comprises a cylindrical lens.

3. The light scanning system as claimed in claim 1, wherein said scanning lens comprises an anamorphic system having different refracting powers in said principal scanning plane and in said secondary scanning plane, said anamorphic convex lens being mounted in a tilted manner such that the principal meridians of said anamorphic convex lens projected via said reflecting surfaces substantially coincide with each principal meridian of said scanning lens.

* * * * *

UNITED STATES PATENT AND TRADEMARK OFFICE
CERTIFICATE OF CORRECTION

PATENT NO. : 5,130,840
DATED : July 14, 1992
INVENTOR(S) : Iima, et al

It is certified that error appears in the above-identified patent and that said Letters Patent is hereby corrected as shown below:

On the title page, item [73] Assignee, "Asahi Kogyo Kogaku Kabushiki Kaisha" should read --Asahi Kogaku Kogyo Kabushiki Kaisha--

Signed and Sealed this

Fifth Day of November, 1996

*Attest:*

BRUCE LEHMAN

*Attesting Officer*     *Commissioner of Patents and Trademarks*